(12) United States Patent
Phillips

(10) Patent No.: US 7,871,351 B2
(45) Date of Patent: Jan. 18, 2011

(54) EFFICIENT EIGHT SPEED AUTOMATIC TRANSMISSION

(75) Inventor: Andrew W. Phillips, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 12/036,641

(22) Filed: Feb. 25, 2008

(65) Prior Publication Data

US 2009/0215579 A1 Aug. 27, 2009

(51) Int. Cl.
*F16H 3/62* (2006.01)
*F16H 3/44* (2006.01)

(52) U.S. Cl. .................. 475/286; 475/287; 475/275; 475/317; 475/318; 475/323; 475/324

(58) Field of Classification Search ............... 475/276, 475/280, 281, 286, 287, 292, 293, 296, 297, 475/303, 317–319, 323–325, 330
See application file for complete search history.

(56) References Cited

U.S. PATENT DOCUMENTS

| | | | | |
|---|---|---|---|---|
| 7,074,153 | B2* | 7/2006 | Usoro et al. | 475/275 |
| 7,108,627 | B2* | 9/2006 | Bucknor et al. | 475/275 |
| 7,150,696 | B2* | 12/2006 | Bucknor et al. | 475/296 |
| 7,247,120 | B2* | 7/2007 | Raghavan et al. | 475/276 |
| 7,250,019 | B2* | 7/2007 | Bucknor et al. | 475/275 |
| 7,303,501 | B2* | 12/2007 | Raghavan et al. | 475/282 |

* cited by examiner

*Primary Examiner*—Tisha D Lewis

(57) ABSTRACT

The present invention provides an eight speed automatic transmission for motor vehicles having three planetary gear sets, four friction clutches, a friction brake, a band brake and an optional overrunning clutch. The eight speed transmission according to the present invention exhibits good gear ratio progression and high efficiency due to its excellent gear mesh efficiency, low spin losses and low pinion speeds.

20 Claims, 2 Drawing Sheets

| GEAR STATE | GEAR RATIO | RATIO STEP | CLUTCHING ELEMENTS ||||||| 
|---|---|---|---|---|---|---|---|---|---|
| | | | 40 | 42 | 36 | 30 | 32 | 34 | 38 |
| REV | -3.735 | | X | | | | X | G | |
| N | | -0.80 | O | | | | O | | |
| 1ST | 4.689 | | C | X | G | | X | | |
| 2ND | 2.780 | 1.69 | | | X | X | X | | |
| 3RD | 1.840 | 1.51 | | | X | | X | X | |
| 4TH | 1.218 | 1.51 | | | X | | X | | X |
| 5TH | 1.000 | 1.22 | | | X | | | X | X |
| 6TH | 0.816 | 1.22 | | | | | X | X | X |
| 7TH | 0.728 | 1.12 | | | | X | | X | X |
| 8TH | 0.670 | 1.09 | | | | X | X | | X |

OVERALL RATIO: 7.00

X - ON, CARRYING TORQUE
O - ON, NOT CARRYING TORQUE
G - GARAGE-SHIFT ELEMENT, ON AND CARRYING TORQUE
C - ON ONLY FOR MANUAL RANGE COAST BRAKING

FIG. 3

EFFICIENT EIGHT SPEED AUTOMATIC TRANSMISSION

FIELD

The present disclosure relates to an automatic transmission and more particularly to a high efficiency eight speed automatic transmission for motor vehicles.

BACKGROUND

The statements in this section merely provide background information related to the present disclosure and may or may not constitute prior art.

A typical modern multiple speed automatic transmission includes a combination of planetary gear assemblies and selectively engaged clutches which achieve a plurality of forward speeds or gears ratios and reverse.

Whereas three and four speed automatic transmissions were once commonplace, considered suitable and provided sufficient flexibility and performance, the industry and consumer preference is moving to six, seven and eight speed automatic transmissions.

In such transmissions, various elements of a plurality of planetary gear assemblies are connected by permanent couplings, selectively connected by clutches and selectively grounded by brakes. Specific combinations of the clutches and brakes are engaged or activated to provide a sequence of numerically related gear ratios and thus speed and torque ratios.

Because they so closely match the power and torque curves of the engine to the imposed load and speed of the vehicle, such six, seven and eight speed transmissions provide significant performance enhancements and reduced fuel consumption.

The present invention is directed to an eight speed automatic transmission having a good ratio progression, excellent gear mesh efficiency, low spin losses and low pinion speeds.

SUMMARY

The present invention provides an eight speed automatic transmission for motor vehicles having three planetary gear sets, four friction clutches, a friction brake and a band brake. The eight speed transmission according to the present invention exhibits high efficiency due to its excellent gear mesh efficiency, low spin losses and low pinion speeds. To improve the quality of the first gear to second gear shift, a freewheeling or overrunning clutch may also be included in the transmission.

Thus it is an object of the present invention to provide an eight speed automatic transmission.

It is a further object of the present invention to provide a high efficiency eight speed automatic transmission.

It is a still further object of the present invention to provide a high efficiency eight speed automatic transmission having a plurality of planetary gear assemblies, friction clutches and brakes.

It is a still further object of the present invention to provide a high efficiency eight speed automatic transmission having three planetary gear assemblies, four friction clutches, a friction brake and a band brake.

It is a still further object of the present invention to provide a high efficiency eight speed automatic transmission having three planetary gear assemblies, four friction clutches, a friction brake, a band brake and, optionally, a one way or overrunning clutch.

It is a still further object of the present invention to provide an eight speed automatic transmission having good gear mesh efficiency, low spin losses and low pinion speeds.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a truth table presenting the state of engagement of the various torque transmitting clutches and brakes in each of the available forward and reverse speeds or gear ratios of the automatic transmission illustrated in FIGS. 1 and 2.

DETAILED DESCRIPTION

The following description is merely exemplary in nature and is not intended to limit the present disclosure, application, or uses.

Figure 1:
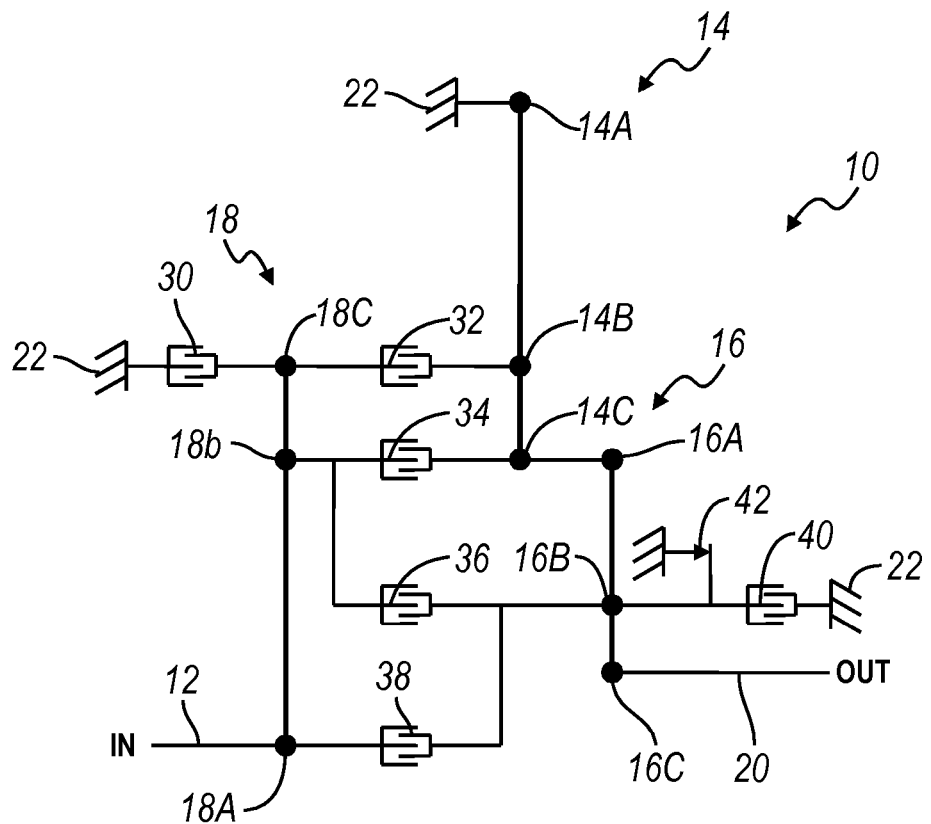
FIG. 1 is a lever diagram of an eight speed automatic transmission according to the present invention.

With reference now to FIG. 1, a multiple, i.e., eight, speed automatic transmission 10 according to the present invention is illustrated in a lever diagram. A lever diagram is a schematic representation of the components of an automatic transmission wherein components of planetary gear assemblies are represented by nodes and the planetary gear assemblies themselves are represented by bold vertical bars. The relative lengths of the vertical bars between nodes of a given planetary gear assembly represent the ratios between the components. Mechanical couplings or interconnections between the nodes of various planetary gear assemblies are represented by horizontal lines and torque transmitting devices such as friction clutches and brakes are represented by interleaved or nested fingers. Further explanation of the format, purpose and use of lever diagrams can be found in SAE Paper No. 810102 entitled "The Lever Analogy: A New Tool in Transmission Analysis" by Benford and Leising which is fully incorporated herein by reference.

The multiple speed automatic transmission 10 includes an input shaft or member 12 which is driven by the output of a torque converter (not illustrated), a first planetary gear assembly 14 having three nodes: a first node 14A, a second node 14B and a third node 14C; a second planetary gear assembly 16 having three nodes: a first node 16A, a second node 16B and a third node 16C and a third planetary gear assembly 18 having a first node 18A, a second node 18B and third node 18C. Drive torque from the transmission 10 is delivered by an output shaft or member 20 to a final drive assembly (not illustrated).

The first node 18A of the third planetary gear assembly 18 is coupled to and driven by the input shaft 12. The third node 14C of the first planetary gear assembly 14 is coupled to the first node 16A of the second planetary gear assembly 16. The first node 14A of the first planetary gear assembly 14 is coupled to ground such as a housing 22 of the transmission 10. The third node 16C if the second planetary gear assembly 16 is coupled to and drives the output shaft 20.

It should be noted that the inventor is familiar with the convention of characterizing a torque controlling or selectively transmitting device disposed between two rotatable members as a clutch whereas such a device disposed between one rotatable member and one fixed or stationary member is characterized as a brake. Within the transmission art, however, such torque controlling or transmitting devices are collectively referred to or characterized as clutches. Accordingly, in the following description, such devices will be referred to or characterized as clutches and if their application and use involves a stationary member to which a rotating member is selectively connected and grounded, the word "brake" will appear in parentheses following the word "clutch."

A first friction clutch (brake) 30 selectively connects the third node 18C of the third planetary gear set 18 to ground such as the transmission housing 22. A second friction clutch 32 selectively connects the second node 14B of the first planetary gear assembly 14 to the third node 18C of the third planetary gear assembly 18. A third friction clutch 34 selectively connects the third node 14C of the first planetary gear assembly 14 to the second node 18B of the third planetary gear assembly 18. A fourth friction clutch 36 selectively connects the second node 16B of the second planetary gear assembly 16 to the second node 18B of the third planetary gear assembly 18. A fifth friction clutch 38 selectively connects the second node 16B of the second planetary gear assembly 16 to the first node 18A of the third planetary gear assembly 18. A first band clutch (brake) 40 selectively connects the second node 16B of the second planetary gear assembly 16 to ground such as the transmission housing 22.

An optional first freewheeling or overrunning clutch (brake) 42 couples the second node 16B of the second planetary gear assembly 16 to ground such as the transmission housing 22 upon rotation relative to ground in one direction and allows the second node 16B of the second planetary gear assembly 16 to freewheel or overrun upon rotation relative to ground, i.e., the transmission housing 22, in the opposite direction.

Figure 2:
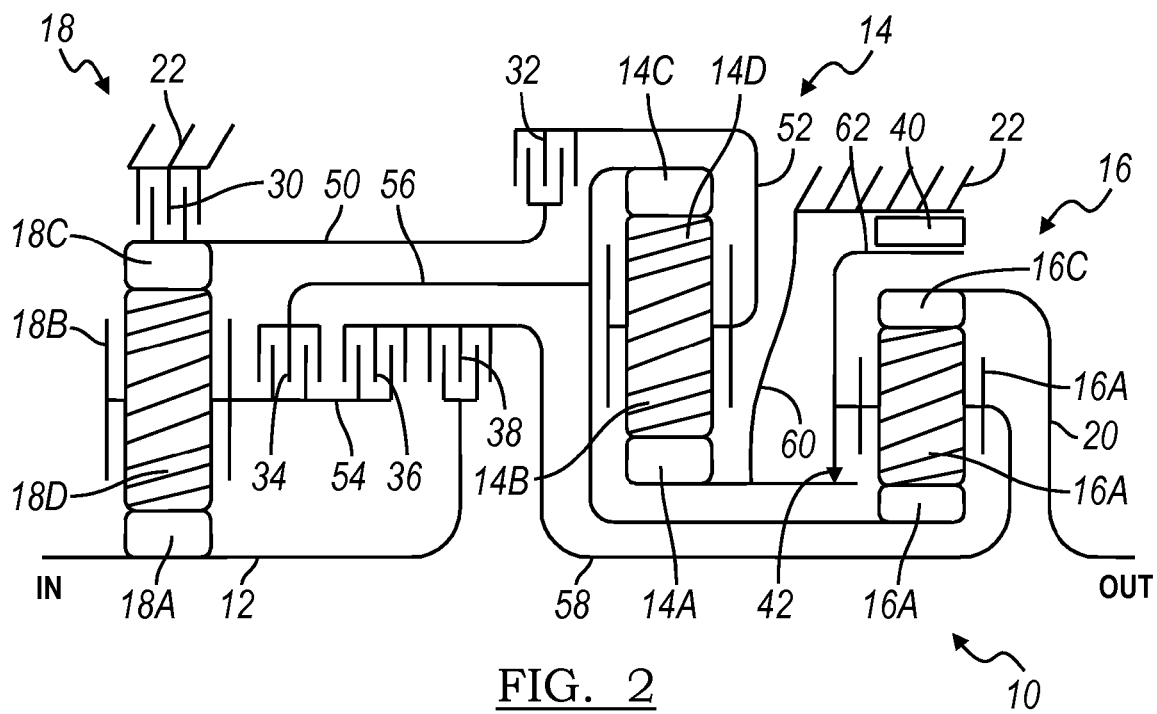
FIG. 2 is a diagrammatic view of an embodiment of an eight speed automatic transmission according to the present invention.

Referring now to FIG. 2, a stick diagram presents a schematic layout of the eight speed automatic transmission 10 according to the present invention. In FIG. 2, the numbering from the lever diagram of FIG. 1 has been carried over. Thus, the clutches, brakes and couplings are correspondingly presented whereas the nodes of the planetary gear assemblies now appear as components of planetary gear assemblies such as sun gears, planet gear carriers and ring gears.

The input shaft or member 12 is continuously connected to and driven by a turbine of a torque converter (not illustrated) which, in turn, is driven by the output of an engine (also not illustrated). The input shaft 12 or an extension thereof is coupled to a third sun gear 18A of the third simple planetary gear assembly 18 and one side of the fifth friction clutch 38. A first shaft, quill or intermediate member 50 couples a third ring gear 18C of the third simple planetary gear assembly 18 and the ungrounded side of the first friction clutch (brake) 30 to one side of the second friction clutch 32. The other side of the second friction clutch 32 is coupled by a second shaft, quill or intermediate member 52 to a first planet gear carrier 14B of the first simple planetary gear assembly 14. Rotatably disposed in the first planet gear carrier 14B of the first simple planetary gear assembly 14 are a plurality of first planet gears 14D, one of which is illustrated in FIG. 2, which are in constant mesh with the first sun gear 14A and the first ring gear 14C of the first simple planetary gear assembly 14. A third shaft, quill or intermediate member 54 couples the third planet gear carrier 18B of the third simple planetary gear assembly 18 to one side of the third friction clutch 34 and one side of the fourth friction clutch 36. Rotatably disposed in the third planet gear carrier 18B of the third simple planetary gear assembly 18 are a third plurality of planet gears 18D, one of which is illustrated in FIG. 2, which are in constant mesh with the third sun gear 18A and the third ring gear 18C of the third simple planetary gear assembly 18.

A fourth shaft, quill or intermediate member 56 couples the other side of the third friction clutch 34 to a first ring gear 14C of the first simple planetary gear assembly 14 and a second sun gear 16A of the second simple planetary gear assembly 16. A fifth shaft, quill or intermediate member 58 couples the other side of the fourth friction clutch 36 and the other side of the fifth friction clutch 38 to a second planet gear carrier 16B of the second simple planetary gear assembly 16. Rotatably disposed in the second planet gear carrier 16B of the second simple planetary gear assembly 16 are a plurality of second planet gears 16D, one of which is illustrated in FIG. 2, which are in constant mesh with the second sun gear 16A and a second ring gear 16C of the second simple planetary gear assembly 16.

A sixth shaft, quill or intermediate member 60 couples a first sun gear 14A of the first simple planetary gear assembly 14 and one side of the optional first freewheeling or overrunning clutch (brake) 42 to ground, such as the housing 22 of the automatic transmission 10. It should be understood that the first freewheeling or overrunning clutch (brake) 42 is optional and may be included in the automatic transmission 10 when the smoothest possible shift between first and second gears is desired. A seventh shaft, quill or intermediate member 62 couples the second planet gear carrier 16B of the second simple planetary gear assembly 16 (and the fourth and fifth friction clutches 36 and 38 through the fifth shaft, quill or intermediate member 58) and the other side of the first freewheeling or overrunning clutch (brake) 42 with one side of the first band clutch (brake) 40. The other side of the first band clutch (brake) 40 is coupled to ground such as the housing 22 of the automatic transmission 10. The output shaft or member 20 is coupled to and driven by the second ring gear 16C of the second planetary gear assembly 16 and, as noted above, is coupled to and drives a final drive assembly such as a prop shaft, differential and axles (all not illustrated).

Referring now to FIG. 3, a truth table is presented which sets forth the various combinations of torque transmitting devices, i.e., clutches and brakes, that are engaged or activated to achieve the various forward and reverse gear states or ratios. Actual numerical gear ratios of the various gear states are also presented although it should be appreciated that these numerical gear ratios are presented by way of illustration and example only and that they may be adjusted over significant ranges to accommodate various applications and operational criteria of the automatic transmission 10.

In the truth table of FIG. 3, an "X" means a torque transmitting device is activated or engaged and is carrying torque, an "O" means a torque transmitting device is activated or engaged but is not carrying torque, a "G" means the torque transmitting device is a garage shift element, is activated or engaged and is carrying torque and a "C" means a torque transmitting device is activated or engaged only in a manual range or setting of the automatic transmission 10 for coast (engine) braking.

In reverse gear, the second friction clutch 32 and the first band clutch (brake) 40 are engaged or activated and the third friction clutch 34 is engaged or activated as a garage shift element and is also carrying torque.

In neutral, both the second friction clutch 32 and the first band clutch (brake) 40 are engaged or activated but neither is carrying torque.

In first gear, the second friction clutch 32 is engaged or activated, the fourth friction clutch 36 is engaged or activated as a garage shift element and the first freewheeling or overrunning clutch (brake) 42 is engaged (locked) and connects the seventh shaft, quill or intermediate member 62, the second planet gear carrier 16B of the second simple planetary gear assembly 16 and associated components to ground. Additionally, the first band clutch (brake) 40 may be engaged or activated in the manual range for coast (engine) braking, if desired.

In second gear, if it is achieved in direct sequence from or following first gear, the first band clutch (brake) 40, if engaged in first gear, is disengaged or deactivated and the first freewheeling or overrunning clutch (brake) 42 is released or disengaged due to a change in the relative direction of rotation between the elements. As noted above, the first freewheeling or overrunning clutch (brake) 42 is an optional component in the automatic transmission 10 which is utilized to improve the quality of the first to second gear shift. The second friction clutch 32 and the fourth friction clutch 36 are maintained in their activated or engaged states and the first friction clutch (brake) 30 is activated or engaged.

In third gear, if it is achieved in direct sequence from or following second gear, the second friction clutch 32 and the fourth friction clutch 36 are maintained in their activated or engaged states, the first friction clutch (brake) 30 is deactivated or disengaged and the third friction clutch 34 is activated or engaged.

In fourth gear, if it is achieved in direct sequence from or following third gear, the second friction clutch 32 and the fourth friction clutch 36 are maintained in their activated or engaged states, the third friction clutch 34 is deactivated or disengaged and the fifth friction clutch 38 is activated or engaged.

In fifth gear, if it is achieved in direct sequence from or following fourth gear, the fourth friction clutch 36 and the fifth friction clutch 38 are maintained in their activated or engaged states, the second friction clutch 32 is deactivated or disengaged and the third friction clutch 34 is activated or engaged.

Sixth, seventh and eighth gears are achieved in a similar manner according to the activation or engagement sequence and states set forth in FIG. 3.

With regard to the foregoing described operation, several features and operational considerations should be noted. First of all, the incorporation of the first freewheeling or overrunning clutch (brake) 42 provides significantly improved first to second gear shifts, especially during hard acceleration. Without the freewheeling clutch 42, the smoothness of the first to second gear shift is primarily dependent upon simultaneous release of one clutch and engagement of another which can be an engineering and operational challenge. The freewheeling clutch 42 obviates this situation by simply releasing certain elements when a desired relative rotational condition is achieved. Second of all, the foregoing description assumes that all clutches and brakes not specifically referenced in a given gear state are inactive or disengaged. Furthermore, and as noted, the description also assumes that during gear shifts between at least adjacent gear states, a clutch or brake that is activated or engaged in both gear states will remain activated or engaged during the shift. Finally, the foregoing description assumes that downshifts follow essentially the opposite sequence of shifts and that power on skip shifts, e.g., from first to third gear or eight to sixth gear, are possible.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising;
    a housing, an input member and an output member,
    a first planetary gear assembly having a first sun gear, a first planet carrier and a first ring gear,
    a second planetary gear assembly having a second sun gear, a second planet carrier and a second ring gear,
    a third planetary gear assembly having a third sun gear, a third planet carrier and a third ring gear,
    a first brake selectively connecting said housing and said third ring gear,
    a first clutch selectively connecting said third ring gear and said first planet carrier,
    a second clutch selectively connecting said third planet carrier and said first ring gear and said second sun gear,
    a third clutch selectively connecting said third planet carrier and said second planet carrier,
    a fourth clutch selectively connecting said third sun gear and said second planet carrier, and
    a second brake selectively connecting said second planet carrier and said housing.

2. The multiple speed automatic transmission of claim 1 wherein said first brake is a friction brake and said second brake is a band brake.

3. The multiple speed automatic transmission of claim 1 wherein said input member is coupled to said third sun gear and said fourth clutch.

4. The multiple speed automatic transmission of claim 1 wherein said output member is coupled to said second ring gear.

5. The multiple speed automatic transmission of claim 1 further including a freewheeling clutch selectively connecting said second planet carrier and said first sun gear and said housing.

6. The multiple speed automatic transmission of claim 1 wherein said clutches include a plurality of interleaved plates.

7. The multiple speed automatic transmission of claim 1 wherein each of said planet carriers rotatably support a plurality of planet gears.

8. An eight speed automatic transmission comprising;
    a housing rotatably supporting an input member and an output member,
    a first planetary gear assembly having a first sun gear, a first planet carrier and a first ring gear,
    a second planetary gear assembly having a second sun gear, a second planet carrier and a second ring gear,
    a third planetary gear assembly having a third sun gear, a third planet carrier and a third ring gear,
    a first torque transmitting device selectively connecting said housing and said third ring gear,
    a second torque transmitting device selectively connecting said third ring gear and said first planet carrier,
    a third torque transmitting device selectively connecting said third planet carrier and said first ring gear and said second sun gear,
    a fourth torque transmitting device selectively connecting said third planet carrier and said second planet carrier,
    a fifth torque transmitting device selectively connecting said third sun gear and said second planet carrier, and
    a sixth torque transmitting device selectively connecting said second planet carrier and said housing.

9. The eight speed transmission of claim 8 wherein said first and sixth torque transmitting devices are brakes and said second, third, fourth and fifth torque transmitting device are clutches.

10. The eight speed transmission of claim 8 wherein said input member is coupled to said third sun gear and said fifth torque transmitting device.

11. The eight speed transmission of claim 8 wherein said output member is coupled to said second ring gear.

12. The eight speed automatic transmission of claim 8 wherein each of said planet carriers rotatably support a plurality of planet gears.

13. The eight speed automatic transmission of claim 8 further including a freewheeling clutch selectively connecting said second planet carrier and said first sun gear and said housing.

14. The eight speed automatic transmission of claim 8 wherein said sixth torque transmitting device is a band brake.

15. An eight speed automatic transmission comprising;
a housing,
a first planetary gear assembly having a first sun gear, a first planet carrier and a first ring gear,
a second planetary gear assembly having a second sun gear, a second planet carrier and a second ring gear,
a third planetary gear assembly having a third sun gear, a third planet carrier and a third ring gear,
a first torque transmitting device selectively connecting said housing and said third ring gear,
a second torque transmitting device selectively connecting said third ring gear and said first planet carrier,
a third torque transmitting device selectively connecting said third planet carrier and said first ring gear and said second sun gear,
a fourth torque transmitting device selectively connecting said third planet carrier and said second planet carrier,
a fifth torque transmitting device selectively connecting said third sun gear and said second planet carrier, and
a sixth torque transmitting device selectively connecting said second planet carrier and said housing.

16. The eight speed automatic transmission of claim 15 further including an input member coupled to said third sun gear and said fifth torque transmitting device.

17. The eight speed automatic transmission of claim 15 further including an output member coupled to said second ring gear.

18. The eight speed automatic transmission of claim 15 wherein said first and sixth torque transmitting devices are brakes and said second, third, fourth and fifth torque transmitting device are clutches.

19. The eight speed automatic transmission of claim 15 further including a seventh torque transmitting device selectively connecting said second planet carrier and said first sun gear.

20. The eight speed automatic transmission of claim 15 further including a seventh torque transmitting device selectively connecting said second planet carrier and said first sun gear and said housing.

* * * * *